United States Patent [19]
Bailey

[11] Patent Number: 5,419,037
[45] Date of Patent: May 30, 1995

[54] METHOD OF INSERTING, BORING, AND HONING A CYLINDER BORE LINER

[75] Inventor: Frank V. Bailey, Racine, Wis.

[73] Assignee: Outboard Marine Corporation, Waukegan, Ill.

[21] Appl. No.: 247,000

[22] Filed: May 20, 1994

[51] Int. Cl.6 ............................................. B23P 15/00
[52] U.S. Cl. ................... 29/888.061; 29/406; 29/888.06; 408/1 R
[58] Field of Search ...................... 29/888.06, 888.061, 29/445, 525, 406; 408/1.1; 123/193.2

[56] References Cited

U.S. PATENT DOCUMENTS

| | | |
|---|---|---|
| 1,927,594 | 9/1933 | Olson . |
| 2,118,317 | 5/1938 | Madek ............................ 29/888.061 |
| 2,361,434 | 10/1944 | Surtees ........................... 29/888.061 |
| 3,273,423 | 9/1966 | Rottler . |
| 3,905,717 | 9/1975 | Brooks ................................. 408/107 |
| 4,307,636 | 12/1981 | Lacey ..................................... 82/1.5 |
| 4,557,640 | 12/1985 | Rottler .................................. 408/27 |
| 4,701,081 | 10/1987 | Hashimoto et al. ................. 408/1 R |
| 4,847,961 | 7/1989 | Donovan et al. ..................... 29/56.5 |
| 4,896,638 | 1/1990 | Shepley ........................... 29/888.061 |
| 4,986,230 | 1/1991 | Panyard et al. ................. 29/888.061 |
| 5,050,547 | 9/1991 | Takahashi ...................... 29/888.061 |
| 5,320,158 | 6/1994 | Helgesen ........................ 29/888.061 |

FOREIGN PATENT DOCUMENTS 3-206473 7/1991 Japan .

Primary Examiner—Irene Cuda
Attorney, Agent, or Firm—Michael, Best & Friedrich

[57] ABSTRACT

A method of manufacturing an engine block assembly which includes a one-piece cylinder block and cylinder head member including a cylinder block portion having a cylindrical bore with an inner end, and a cylinder head portion including a cylinder head surface at the inner end of the cylindrical bore, and a sleeve in the cylindrical bore and including an inner cylindrical surface engaging the cylinder head surface at the inner end of the cylindrical bore, the method includes the steps of fabricating a one piece cylinder head and cylinder block member including a cylindrical bore having, at the inner end thereof, a cylinder head surface, fabricating a sleeve with an inner cylindrical surface and an inner end, partially inserting the sleeve into the cylindrical bore such that the inner end of the sleeve is spaced from the cylinder head surface, boring the inner cylindrical surface of the sleeve, honing the inner cylindrical surface of the sleeve, and fully inserting the sleeve into the cylindrical bore such that the inner end of the sleeve engages the cylinder head surface.

4 Claims, 1 Drawing Sheet

METHOD OF INSERTING, BORING, AND HONING A CYLINDER BORE LINER

BACKGROUND OF THE INVENTION

The invention relates generally to internal combustion engines, and more particularly, to insertion of a cylinder liner or sleeve into a cylindrical bore of a one-piece integral cylinder block and cylinder head member, and boring and honing of the cylinder liner or sleeve. In the past, cylinder liners were commonly bored and honed after full insertion thereof into the cylindrical bore of a cylinder block. When a separate cylinder head was employed, such full insertion and subsequent boring and honing did not involve problems of chip breaking and chip disposal and disposal of honing debris. However, full insertion of a cylinder liner into the cylindrical bore of a one-piece cylinder block and cylinder head member and subsequent boring and honing involves breaking the chip at the inner end of the liner, without the availability of a chip clearance area and with possible consequent engagement of the boring tool with the adjacent cylinder head surface. In addition, full liner insertion also prevents running off or run-by of the inner end of the honing tool or stone from the inner end of the cylindrical surface of the cylinder liner. In the absence of such running off, i.e., movement of the inner end of the honing tool or stone beyond the inner end of the inner cylindrical surface of the liner, the inner end of the honing tool or stone is exposed to excessive wear.

One possible solution to the problem of boring and honing the liner of a one-piece cylinder block and cylinder head member after full insertion of the liner into the cylindrical bore involves the employment of an undercut or counter bore at the inner end of the inner cylindrical surface of the liner. Such a counter bore or area of increased diametric volume at the inner end of the liner or sleeve is minimal and highly undesirable Because this area can be wiped by the piston or piston rings and, depending on the axial length thereof, is diametrically too large. Furthermore, the increased volume provided by such an under-cut or counter bore can trap fuel and lubricant which aggravates emissions.

Another possible solution involves boring and honing of the liner or sleeve prior to insertion of the liner or sleeve into the cylinder block. However, with such pre-boring and honing, followed by insertion, problems arise with respect to proper location of the axis of the inner cylindrical surface, with respect to proper lateral bore spacing in multiple cylinder engines, and with respect to deformation of the cylindricity of the inner cylindrical surface consequent to the insertion.

Attention is directed to the following U.S. patents:

| U.S. Pat. No. | Inventor(s) | Issue Date |
| --- | --- | --- |
| 1,927,594 | C. A. Olson | September 19, 1933 |
| 3,273,423 | D. B. Rottler | September 20, 1966 |
| 3,905,717 | Daryl G. Brooks | September 16, 1975 |
| 4,307,636 | Patrick J. Lacey | December 29, 1981 |
| 4,557,640 | D. B. Rottler | December 10, 1985 |
| 4,701,081 | Hashimoto, et al. | October 20, 1987 |
| 4,847,961 | Donovan, et al. | July 18, 1989 |

Attention is also directed to Japanese application 3-206473 filed Jul. 23, 1991.

SUMMARY OF THE INVENTION

The invention provides a method of manufacturing an engine block assembly comprising a one-piece cylinder block and cylinder head member including a cylinder block portion having a cylindrical bore with an inner end, and a cylinder head portion including a cylinder head surface at the inner end of the cylindrical bore, and a sleeve tightly received in the cylindrical bore and including an inner cylindrical surface engaging the cylinder head surface at the inner end of the cylindrical bore, which method comprises the steps of fabricating a one-piece cylinder head and cylinder block member including a cylindrical bore having, at the inner end thereof, a cylinder head surface, fabricating a sleeve with an inner cylindrical surface and an inner end, partially inserting the sleeve into the cylindrical bore such that the inner end of the sleeve is spaced from the cylinder head surface, boring the inner cylindrical surface of the sleeve, honing the inner cylindrical surface of the sleeve, and fully inserting the sleeve into the cylindrical bore such that the inner end of the sleeve engages the cylinder head surface.

The invention also provides a method of manufacturing an engine block assembly comprising a one-piece cylinder block and cylinder head member including a cylinder block portion having a cylindrical bore with an inner end, and a cylinder head portion including a cylinder head surface at the inner end of the cylindrical bore, and a sleeve tightly received in the cylindrical bore and including an inner cylindrical surface engaging the cylinder head surface at the inner end of the cylindrical bore, which method comprises the steps of fabricating a one-piece cylinder head and cylinder block member including a cylindrical bore having, at the inner end thereof, a cylinder head surface, fabricating a liner with an inner cylindrical surface and an inner end, partially inserting the sleeve into the cylindrical bore such that the inner end of the sleeve is spaced from the cylinder head surface, boring the inner cylindrical surface of the sleeve, removing boring chips from between the inner end of the sleeve and the cylinder head surface, honing the inner cylindrical surface of the sleeve, removing honing debris from between the inner end of the sleeve and the cylinder head surface, and fully inserting the sleeve into the cylindrical bore such that the inner end of the sleeve engages the cylinder head surface.

Other features and advantages of the invention will become apparent to those skilled in the art upon review of the following detailed description, claims and drawings.

Figure 1:
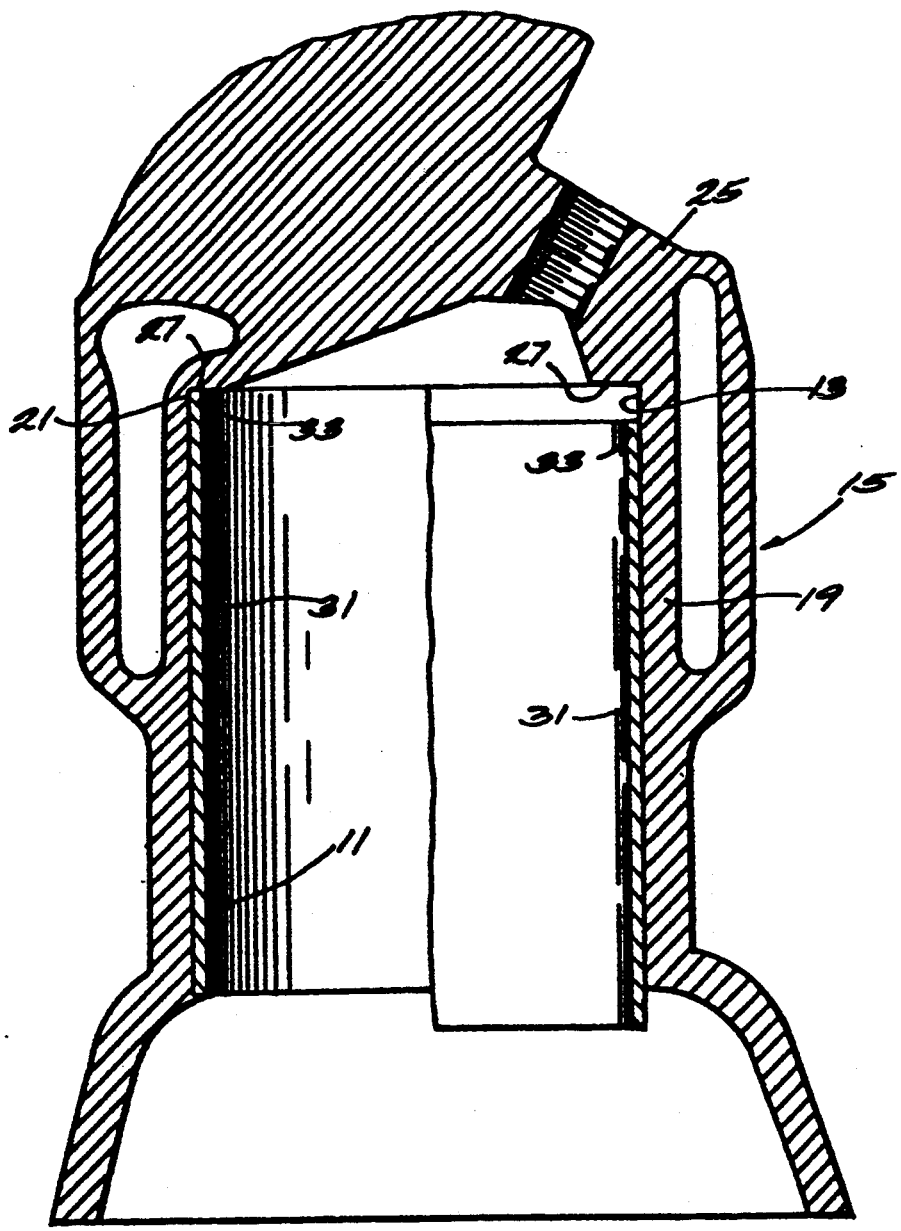
FIG. 1 is a sectional view of a one-piece cylinder block and cylinder head member, together with a cylinder liner which is tightly received in the one-piece cylinder block and cylinder head member and wherein, at the right, the liner is partially inserted or received in the member and wherein, at the left, the liner is fully or completely inserted into the member.

Before one embodiment of the invention is explained in detail, it is to be understood that the invention is not limited in its application to the details of the construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

The drawings are illustrative of a method of boring, honing, and inserting a liner or sleeve 11 into a cylindrical bore 13 in a one-piece cylinder block and cylinder head member 15.

More specifically, the method involves the step of fabricating the one-piece integral cylinder block and cylinder head member 15 with a cylinder block portion 19 including the cylindrical bore 13. The one-piece cylinder block and cylinder head member 15 is also fabricated, at the inner end 21 of the cylindrical bore 13, with a cylinder head portion 25 including a cylinder head surface 27 extending generally perpendicularly to the axis of the cylindrical bore 13 and extending radially outwardly to the inner end 21 of the cylindrical bore 13. Typically, such a one-piece cylinder block and cylinder head member 15 is cast in aluminum..

The method also involves the step of fabricating the cylinder liner or sleeve 11 from a suitable material, such as cast iron, which liner or sleeve 11 includes an inner cylindrical surface 31 having an inner end 33. Such liners or sleeves typically have an axial length between about four (4) and six (6) inches.

Thereafter, the method also involves the step of partially inserting the sleeve or liner 11 most of the way into the cylindrical bore 13 of the cylinder block portion 19 such that the inner end 33 of the liner or sleeve 11 is spaced from the cylinder head surface 27. Preferably, the inner end 33 of the sleeve or liner 11 is spaced from the cylinder head surface 27 at a relatively small distance such as, for instance, a distance in the range of about one quarter ($\frac{1}{4}$) to one half ($\frac{1}{2}$) of an inch.

Thereafter, the method also involves the step of boring the inner cylindrical surface 31 with a suitable boring tool (not shown) which creates a chip at the leading or inner end of the tool. The spacing of the inner end of the liner or sleeve 11 from the cylinder head surface 27 facilitates easy breaking of the chip from the liner or sleeve 11 because the inner end of the boring tool can pass inwardly beyond the inner end of 33 the liner or sleeve 11 without contacting the cylinder head surface 27.

Thereafter, the method also involves removal of the boring tool and any chips which may have accumulated in the cylindrical bore 13, and particularly, from adjacent the cylinder head surface 27 and from between the inner end of the liner or sleeve 11 and the cylinder head surface 27. Such removal can be accomplished in any suitable manner, such as by cleansing with a stream of pressure air or by washing with a stream of liquid.

Thereafter, the method involves the step of honing the bored inner cylindrical surface 33 of the liner or sleeve 11 with a suitable honing tool or stone (not shown) which is typically one and a half inches (1$\frac{1}{2}$) or so long and which is axially reciprocated against the inner cylindrical surface 33 of the liner or sleeve 11. The spacing of the inner end 33 of the liner or sleeve 11 from the cylinder head surface 27 permits movement of the inner end of the honing tool or stone inwardly beyond the inner end 33 of the liner or sleeve 11, i.e., permits running off, thus preventing excessive wear on the inner end of the honing tool or stone.

Thereafter, the method involves removal of the honing tool or stone, followed by removal of the abrasive debris (resulting from the honing step) from the inner end 21 of the cylindrical bore 13, and particularly, from adjacent the cylinder head surface 27 and from between the inner end 33 of the liner or sleeve 11 and the cylinder head surface 27. Such removal can be accomplished in any suitable manner, as for instance, by washing the inner end 21 of the cylindrical bore 13 with a solvent or a soapy washing solution to effectively carry away any such honing debris.

Thereafter, the method involves the step of fully or completely inserting the liner or sleeve 11 into the cylindrical bore 13 such that the inner end 33 of the liner or sleeve 11 fully engages the cylinder head surface 27.

Any suitable means can be employed for partially and thereafter fully inserting or pressing the liner or sleeve 11 into the cylindrical bore 13.

As a result of the method described above, the liner or sleeve 11 can be accurately bored and honed as the inner end portion thereof (which is contacted by the piston or piston ring during engine operation) has been tightly housed in the cylindrical bore 13 in the cylinder block portion 19 during the boring and honing step. The remaining insertion of the liner or sleeve 11 into the cylindrical bore 13 is not detrimental to the cylindricity of the liner or sleeve 11.

While the discussed method is particularly suited for use in connection with one-piece cylinder block and cylinder head members intended for use in a four-stroke engine (where there are no side ports), the invention is also applicable to such assemblies intended for use in two-stroke engines where side ports are employed.

Locating the liner or sleeve most of the way into the cylinder bore 13 allows better dimensional accuracy than inserting a prefinished sleeve. This is because the cylinder block portion 19 exerts asymmetrical pressure on the liner or sleeve 11 as it is pressed or shrunk into the cylinder block portion 19. This pressure will, in many cases, distort the liner or sleeve 11. By inserting the liner or sleeve 11 most of the way, the distorting forces have already acted on the liner or sleeve 11 before the boring and honing operations, and such operations bring the inner cylindrical surface 31 of the liner or sleeve 11 back to the preferred cylindrical shape. The distortion of the bore during the remainder of the insertion, as already mentioned, is minimized.

Various of the features of the invention are set forth in the following claims.

I claim:

1. A method of manufacturing an engine block assembly comprising a one-piece cylinder block and cylinder head member including a cylinder block portion having a cylindrical bore with an inner end, and a cylinder head portion including a cylinder head surface at the inner end of the cylindrical bore, and a sleeve tightly received in the cylindrical bore and including an inner cylindrical surface engaging the cylinder head surface at the inner end of the cylindrical bore, said method comprising the steps of fabricating a one-piece cylinder head and cylinder block member including a cylindrical bore having, at the inner end thereof, a cylinder head surface, separately fabricating a sleeve with an inner cylindrical surface and an inner end, thereafter partially inserting the sleeve into the cylindrical bore such that the inner end of the sleeve is spaced from the cylinder head surface, thereafter boring the inner cylindrical surface of the sleeve, thereafter honing the inner cylindrical surface of the sleeve, and thereafter fully inserting the sleeve into the cylindrical bore such that the inner end of the sleeve engages the cylinder head surface.

2. A method in accordance with claim 1 wherein said step of partially inserting the sleeve into the cylinder bore spaces the inner end of the sleeve from the cylinder head surface at a distance of about ¼ to ½ inch.

3. A method of manufacturing an engine block assembly comprising a one-piece cylinder block and cylinder head member including a cylinder block portion having a cylindrical bore with an inner end, and a cylinder head portion including a cylinder head surface at the inner end of the cylindrical bore, and a sleeve tightly received in the cylindrical bore and including an inner cylindrical surface engaging the cylinder head surface at the inner end of the cylindrical bore, said method comprising the steps of fabricating a one-piece cylinder head and cylinder block member including a cylindrical bore having, at the inner end thereof, a cylinder head surface, separately fabricating a liner with an inner cylindrical surface and an inner end, thereafter partially inserting the sleeve into the cylindrical bore such that the inner end of the sleeve is spaced from the cylinder head surface, thereafter boring the inner cylindrical surface of the sleeve, thereafter removing boring chips from between the inner end of the sleeve and the cylinder head surface, thereafter honing the inner cylindrical surface of the sleeve, thereafter removing honing debris from between the inner end of the sleeve and the cylinder head surface, and thereafter fully inserting the sleeve into the cylindrical bore such that the inner end of the sleeve engages the cylinder head surface.

4. A method in accordance with claim 3 wherein said step of partially inserting the sleeve into the cylinder bore spaces the inner end of the sleeve from the cylinder head surface at a distance of about ¼ to ½ inch.

* * * * *